United States Patent
Shono et al.

(10) Patent No.: US 11,505,760 B2
(45) Date of Patent: Nov. 22, 2022

(54) REFRIGERATOR OIL

(71) Applicant: ENEOS Corporation, Tokyo (JP)

(72) Inventors: Yohei Shono, Tokyo (JP); Akira Tada, Tokyo (JP); Yuya Mizutani, Tokyo (JP); Takeshi Okido, Tokyo (JP); Hidetoshi Ogata, Tokyo (JP); Tatsuki Nakajima, Tokyo (JP)

(73) Assignee: ENEOS CORPORATION, Tokyo (JP)

(*) Notice: Subject to any disclaimer, the term of this patent is extended or adjusted under 35 U.S.C. 154(b) by 601 days.

(21) Appl. No.: 16/077,932

(22) PCT Filed: Feb. 15, 2017

(86) PCT No.: PCT/JP2017/005548
§ 371 (c)(1),
(2) Date: Aug. 14, 2018

(87) PCT Pub. No.: WO2017/145896
PCT Pub. Date: Aug. 31, 2017

(65) Prior Publication Data
US 2021/0054301 A1 Feb. 25, 2021

(30) Foreign Application Priority Data
Feb. 24, 2016 (JP) .............................. JP2016-033437

(51) Int. Cl.
C09K 5/04 (2006.01)
C10M 171/00 (2006.01)
C10M 101/00 (2006.01)
C10M 131/04 (2006.01)
C10M 169/04 (2006.01)
C10N 20/00 (2006.01)
C10N 30/02 (2006.01)
C10N 40/30 (2006.01)

(52) U.S. Cl.
CPC ......... C10M 171/008 (2013.01); C09K 5/044 (2013.01); C10M 101/00 (2013.01); C10M 131/04 (2013.01); C10M 169/04 (2013.01); C09K 2205/126 (2013.01); C10M 2211/022 (2013.01); C10N 2020/099 (2020.05); C10N 2030/02 (2013.01); C10N 2040/30 (2013.01)

(58) Field of Classification Search
CPC ............ C10M 171/008; C10M 101/00; C10M 131/04; C10M 169/04; C10M 2211/022; C10N 2020/099; C10N 2030/02; C10N 2040/30; C09K 2205/126
See application file for complete search history.

(56) References Cited

U.S. PATENT DOCUMENTS

| | | | | |
|---|---|---|---|---|
| 4,521,296 A * | 6/1985 | Kunihiro | ................. | C10G 67/06 208/14 |
| 10,253,276 B2 * | 4/2019 | Takahashi | ............ | C10M 101/02 |
| 10,759,982 B2 * | 9/2020 | Shono | .................. | C10M 169/04 |
| 2007/0275865 A1 * | 11/2007 | Tagawa | ............... | C10M 171/008 508/438 |
| 2009/0072188 A1 * | 3/2009 | Machado | ............. | C10M 105/06 252/68 |
| 2009/0159836 A1 * | 6/2009 | Kaneko | ................. | C10M 169/04 252/68 |
| 2014/0077122 A1 * | 3/2014 | Fukushima | ........... | F25B 31/002 252/67 |
| 2014/0077123 A1 * | 3/2014 | Fukushima | ............. | F25B 9/002 252/67 |
| 2014/0230465 A1 | 8/2014 | Thomas et al. | | |
| 2015/0014574 A1 * | 1/2015 | Saito | ....................... | C09K 5/042 252/68 |
| 2015/0045265 A1 * | 2/2015 | Matsumoto | .......... | C10M 133/16 508/261 |
| 2015/0115194 A1 * | 4/2015 | Saito | ..................... | C10M 169/04 252/68 |
| 2015/0203732 A1 * | 7/2015 | Saito | .................. | C10M 171/008 252/68 |
| 2015/0307761 A1 * | 10/2015 | Saito | .................... | C10M 169/04 252/68 |
| 2015/0376543 A1 * | 12/2015 | Saito | ....................... | C09K 5/042 252/68 |
| 2016/0075927 A1 * | 3/2016 | Fukushima | ............ | C09K 5/045 252/68 |
| 2016/0333244 A1 * | 11/2016 | Fukushima | ............ | C09K 5/045 |
| 2016/0347982 A1 * | 12/2016 | Fukushima | ............ | C09K 5/045 |
| 2016/0355717 A1 * | 12/2016 | Fukushima | ............. | F25B 43/00 |
| 2016/0355719 A1 * | 12/2016 | Fukushima | ........... | F25B 31/002 |

(Continued)

FOREIGN PATENT DOCUMENTS

| CN | 1470626 A | 1/2004 |
|---|---|---|
| CN | 105132088 A | 12/2015 |

(Continued)

OTHER PUBLICATIONS

Yan Qi Sen, "Refrigeration technology and its application", China Construction Industry Press, 1st Edition, 1st Print, p. 113, Jun. 2006, partial English Translation.
International Search Report in International application PCT/JP2017/005548 dated Mar. 28, 2017.
International Preliminary Report on Patentability in International application PCT/JP2017/005548 dated Sep. 7, 2018.
CN Office Action issued in CN Patent App. No. 201780006342.6, dated Jul. 16, 2020, Search Report.
Yang Gang et al., "New Refrigerants—HFO-1234ze and HFO-1234yf", Organo-Fluorine Industry (No. 3, 2009), 2009, with partial English translation—Abstract.

Primary Examiner — Ellen M McAvoy
(74) Attorney, Agent, or Firm — Greenblum & Bernstein, P.L.C.

(57) ABSTRACT

The present invention provides a refrigerating machine oil comprising a hydrocarbon-based base oil having a viscosity index of 120 or less, and the refrigerating machine oil being used with a 1-chloro-2,3,3,3-tetrafluoropropene refrigerant.

6 Claims, No Drawings

(56) References Cited

U.S. PATENT DOCUMENTS

| | | | |
|---|---|---|---|
| 2017/0058174 A1* | 3/2017 | Fukushima | F25B 43/00 |
| 2017/0166831 A1* | 6/2017 | Matsumoto | C10M 107/24 |
| 2018/0044567 A1* | 2/2018 | Tasaka | F25B 1/053 |
| 2018/0066170 A1* | 3/2018 | Tasaka | C10M 171/008 |
| 2019/0078005 A1* | 3/2019 | Shono | C10M 171/008 |

FOREIGN PATENT DOCUMENTS

| | | |
|---|---|---|
| JP | 2009-298927 A | 12/2009 |
| JP | 2013/249326 | 12/2013 |
| WO | 2012/157763 | 11/2012 |
| WO | 2015/163071 | 10/2015 |
| WO | 2015/182173 A1 | 12/2015 |
| WO | 2016/009884 A1 | 1/2016 |
| WO | 2016/171264 | 10/2016 |

* cited by examiner

REFRIGERATOR OIL

TECHNICAL FIELD

The present invention relates to a refrigerating machine oil, use of a composition containing a hydrocarbon-based base oil to for a refrigerating machine oil, and use of a composition containing a hydrocarbon-based base oil for manufacturing a refrigerating machine oil.

BACKGROUND ART

Because of the problem of destruction of the ozone layer in recent years, CFC (chlorofluorocarbon) and HCFC (hydrochlorofluorocarbon), which have been used as a refrigerant for refrigerating equipment until now, are subject to regulation, and HFC (hydrofluorocarbon) is being used as a refrigerant in place of them. However, HFC-134a, which is normally used as a refrigerant for car air-conditioner, among HFC refrigerants has an ozone depletion potential of zero but has a high global warming potential (GWP), and thus is subject to regulation in Europe.

The development of a refrigerant which has a little influence on the ozone layer and a low GWP is urgently needed against such background. Patent Literature 1, for example, discloses using a 1-chloro-2,3,3,3-tetrafluoropropene refrigerant from the viewpoint of, for example, a little influence on the ozone layer and a little influence on global warming.

In the meantime, hydrocarbon oils such as mineral oil and alkylbenzenes have been favorably used as a refrigerating machine oil when conventional CFC and HCFC are used as a refrigerant; however, refrigerating machine oils have unexpected behavior such as compatibility with a refrigerant, lubricity, viscosity of a solution with a refrigerant, and thermochemical stability depending on the types of coexisting refrigerant, and thus the development of a refrigerating machine oil for each refrigerant is required.

CITATION LIST

Patent Literature

Patent Literature 1: WO 2012/157763

SUMMARY OF INVENTION

Technical Problem

An object of the present invention is to provide a refrigerating machine oil which has a good compatibility with a 1-chloro-2,3,3,3-tetrafluoropropene (HCFO-1224yf) refrigerant.

Solution to Problem

The present invention provides a refrigerating machine oil comprising a hydrocarbon-based base oil, having a viscosity index of 120 or less, and being used with a 1-chloro-2,3,3,3-tetrafluoropropene refrigerant.

The present invention also provides a working fluid composition for a refrigerating machine comprising a refrigerating machine oil containing a hydrocarbon-based base oil and having a viscosity index of 120 or less, and a 1-chloro-2,3,3,3-tetrafluoropropene refrigerant.

The above hydrocarbon-based base oil preferably has a viscosity index of 120 or less.

The above hydrocarbon-based base oil preferably has a % $C_N$ of 10 to 75.

The above refrigerating machine oil may further contain at least one additive selected from the group consisting of an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier and a rust inhibitor.

It can be also said that the present invention is an use of a composition containing a hydrocarbon-based base oil to a refrigerating machine oil or a working fluid composition for a refrigerating machine, wherein the composition has a viscosity index of 120 or less, the refrigerating machine oil is used with a 1-chloro-2,3,3,3-tetrafluoropropene refrigerant and the working fluid composition for a refrigerating machine contains the refrigerating machine oil and a 1-chloro-2,3,3,3-tetrafluoropropene refrigerant.

It can be also said that the present invention is an use of a composition containing a hydrocarbon-based base oil for manufacturing a refrigerating machine oil or a working fluid composition for a refrigerating machine, wherein the composition has a viscosity index of 120 or less, the refrigerating machine oil is used with a 1-chloro-2,3,3,3-tetrafluoropropene refrigerant, and the working fluid composition for a refrigerating machine contains the refrigerating machine oil and the 1-chloro-2,3,3,3-tetrafluoropropene refrigerant.

Advantageous Effects of Invention

According to the present invention, it is possible to provide a refrigerating machine oil with a good compatibility with a 1-chloro-2,3,3,3-tetrafluoropropene (HCFO-1224yf) refrigerant.

DESCRIPTION OF EMBODIMENTS

The embodiment of the present invention will now be described in detail.

The refrigerating machine oil according to the present embodiment contains a hydrocarbon-based base oil, has a viscosity index of 120 or less, and is used with a 1-chloro-2,3,3,3-tetrafluoropropene refrigerant.

The working fluid composition for a refrigerating machine according to the present embodiment comprises a refrigerating machine oil containing a hydrocarbon-based base oil, having a viscosity index of 120 or less, and a 1-chloro-2,3,3,3-tetrafluoropropene refrigerant. A working fluid composition for a refrigerating machine according to the present embodiment includes an embodiment, which contains a refrigerating machine oil according to the present embodiment and a 1-chloro-2,3,3,3-tetrafluoropropene refrigerant.

As the hydrocarbon-based base oil, a mineral oil-based hydrocarbon oil, a synthetic hydrocarbon oil or a mixture thereof can be used.

The mineral oil-based hydrocarbon oil can be obtained by refining a lubricating oil distillate obtained by atmospheric distillation and vacuum distillation of e.g. paraffinic or naphthenic crude oil by methods such as solvent deasphalting, solvent refining, hydrotreating, hydrocracking, solvent dewaxing, hydrodewaxing, clay treatment, and sulfuric acid treatment. These refining methods can be used individually or two or more methods can be used in combination.

As the synthetic hydrocarbon oil, there are an alkylbenzene, an alkylnaphthalene, a poly-α-olefin (PAO), a polybutene, an ethylene-α-olefin copolymer and the like.

The alkylbenzene is preferably an alkylbenzene (A) and/or an alkylbenzene (B) described below in terms of long term reliability of refrigerating system.

Alkylbenzene (A): an alkylbenzene having 1 to 4 C1-19 alkyl groups, wherein the total number of carbons in the alkyl groups is 9 to 19 (more preferably an alkylbenzene having 1 to 4 C1-15 alkyl groups, wherein the total number of carbons in the alkyl groups is 9 to 15).

Alkylbenzene (B): an alkylbenzene having 1 to 4 C1-40 alkyl groups, wherein the total number of carbons in the alkyl groups is 20 to 40 (more preferably an alkylbenzene having 1 to 4 C1-30 alkyl groups, wherein the total number of carbons in the alkyl groups is 20 to 30).

Specific examples of C1-19 alkyl groups in the alkylbenzene (A) include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group and the like. When these alkyl groups have isomers, the C1-19 alkyl group can be any of the isomers. These alkyl groups can be linear or branched, and is preferably a branched alkyl group from the viewpoint of stability, viscosity characteristics, etc., and more preferably a branched alkyl group derived from olefin oligomers such as propylene, butene and isobutylene particularly from the viewpoint of availability.

The number of alkyl groups in the alkylbenzene (A) is 1 to 4, and an alkylbenzene having one or two alkyl groups, i.e. a monoalkylbenzene, a dialkylbenzene or a mixture thereof is most preferably used from the viewpoint of stability and availability.

The alkylbenzene (A) can be not only an alkylbenzene having a single structure, but also a mixture of alkylbenzenes having different structures as long as the mixture is an alkylbenzene which meets the conditions that the number of C1-19 alkyl groups be 1 to 4 and the total number of carbons in the alkyl group(s) be 9 to 19.

Specific examples of C1-40 alkyl groups in the alkylbenzene (B) include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, an icosyl group, a henicosyl group, a docosyl group, a tricosyl group, a tetracosyl group, a pentacosyl group, a hexacosyl group, a heptacosyl group, an octacosyl group, a nonacosyl group, a triacontyl group, a hentriacontyl group, a dotriacontyl group, a tritriacontyl group, a tetratriacontyl group, a pentatriacontyl group, a hexatriacontyl group, a heptatriacontyl group, an octatriacontyl group, a nonatriacontyl group, a tetracontyl group and the like. When these alkyl groups have isomers, the C1-40 alkyl group can be any of the isomers. These alkyl groups can be linear or branched, and are preferably a branched alkyl group from the viewpoint of stability, viscosity characteristics, etc., and more preferably a branched alkyl group derived from olefin oligomers such as propylene, butene and isobutylene particularly from the viewpoint of availability.

The number of alkyl groups in the alkylbenzene (B) is 1 to 4, and an alkylbenzene having one or two alkyl groups, i.e. a monoalkylbenzene, a dialkylbenzene or a mixture thereof is most preferably used from the viewpoint of stability and availability.

The alkylbenzene (B) can be not only an alkylbenzene having a single structure, but also a mixture of alkylbenzenes having different structures as long as the mixture is an alkylbenzene which meets the conditions that the number of C1-40 alkyl groups be 1 to 4 and the total number of carbons in the alkyl group(s) be 20 to 40.

A method for producing an alkylbenzene is optional and is not particularly limited, and a synthetic method described below can be generally used.

As an aromatic compound, a raw material, specifically for example benzene, toluene, xylene, ethylbenzene, methylethylbenzene, diethylbenzene and a mixture of thereof are used. As an alkylating agent, specifically for example lower monoolefins such as ethylene, propylene, butene and isobutylene, preferably a C6-40 linear or branched olefin obtained by polymerizing propylene; a C6-40 linear or branched olefin obtained by thermal cracking of wax, heavy oil, a petroleum distillate, polyethylene, polypropylene, etc.: a C6-40 linear olefin obtained by olefination of n-paraffin separated from a petroleum distillate of kerosene, light oil, etc. using a catalyst; and a mixture thereof, and the like can be used.

As an alkylating catalyst for alkylation, known catalysts, for example, Friedel-Crafts catalysts such as aluminum chloride and zinc chloride; and acidic catalysts such as sulfuric acid, phosphoric acid, silicotungstic acid, hydrofluoric acid and activated cray are used.

The viscosity index of the hydrocarbon-based base oil is preferably 120 or less, more preferably 115 or less, further preferably 110 or less, particularly preferably 105 or less, and most preferably 100 or less from the viewpoint of compatibility with a 1-chloro-2,3,3,3-tetrafluoropropene refrigerant. The viscosity index of the hydrocarbon-based base oil is preferably −50 or more, more preferably −40 or more and further preferably −30 or more from the viewpoint of lubricity. The viscosity index of the hydrocarbon-based base oil is preferably −50 to 120, −50 to 115, −50 to 110, −50 to 105, −50 to 100, −40 to 120, −40 to 115, −40 to 110, −40 to 105, −40 to 100, −30 to 120, −30 to 115, −30 to 110, −30 to 105, or −30 to 100 from the viewpoint of providing both compatibility and lubricity.

The kinematic viscosity at 40° C. of the hydrocarbon-based base oil is preferably 1 $mm^2/s$ or more, more preferably 10 $mm^2/s$ or more, further preferably 20 $mm^2/s$ or more, and also preferably 500 $mm^2/s$ or less, more preferably 120 $mm^2/s$ or less, and further preferably 80 $mm^2/s$ or less. The kinematic viscosity at 100° C. of the hydrocarbon-based base oil is preferably 1 $mm^2/s$ or more, more preferably 2 $mm^2/s$ or more, further preferably 5 $mm^2/s$ or more, and also preferably 30 $mm^2/s$ or less, more preferably 12 $mm^2/s$ or less, and further preferably 10 $mm^2/s$ or less. The kinematic viscosity of the hydrocarbon-based base oil within the above range is preferred because lubricity can be maintained.

The kinematic viscosity at 40° C. and 100° C. and viscosity index in the present invention mean values measured in accordance with "Crude petroleum and petroleum products-Determination of kinematic viscosity and calculation of viscosity index from kinematic viscosity" in JIS K2283:2000 respectively.

The % $C_P$ of the hydrocarbon-based base oil is preferably 25 or more, more preferably 35 or more, further preferably 40 or more, and also preferably 90 or less, more preferably 70 or less, and further preferably 60 or less from the viewpoint of the stability and lubricity of the refrigerating machine oil.

[003.5] The % $C_P$ of the hydrocarbon-based base oil is preferably 60 or less, more preferably 55 or less, and can be preferably 30 or more, 35 or more or 40 or more from the viewpoint that two-layer separation temperature when the refrigerating machine oil/refrigerant ratio in a working fluid composition for a refrigerating machine is low (e.g. the ratio of refrigerating machine oil is 5 to 20 mass %) is easily lowered.

The % $C_N$ of the hydrocarbon-based base oil is preferably 10 or more or 20 or more, more preferably 30 or more or 35 or more, further preferably 40 or more, and also preferably 75 or less, more preferably 70 or less, and further preferably 60 or less from the viewpoint of an even better compatibility with a 1-chloro-2,3,3,3-tetrafluoropropene refrigerant. The % $C_N$ of the hydrocarbon-based base oil is preferably 10 to 75, 10 to 70, 10 to 60, 20 to 75, 20 to 70, 20 to 60, 30 to 75, 30 to 70, 30 to 60, 35 to 75, 35 to 70, 35 to 60, 40 to 75, 40 to 70, or 40 to 60 from the viewpoint of an even better compatibility with a 1-chloro-2,3,3,3-tetrafluoropropene refrigerant.

The % $C_N$ of the hydrocarbon-based base oil is preferably 30 or more, more preferably 35 or more, and can be preferably 75 or less, 60 or less, 50 or less or 45 or less from the viewpoint that two-layer separation temperature when the refrigerating machine oil/refrigerant ratio in a working fluid composition for a refrigerating machine is low (e.g. the ratio of refrigerating machine oil is 5 to 20 mass %) is easily lowered.

The % $C_N$/% $C_P$ of the hydrocarbon oil is preferably 0.4 or more, more preferably 0.6 or more, further preferably 0.7 or more, and can be preferably 2 or less, 1.5 or less, 1.2 or less or 1.0 or less from the viewpoint that two-layer separation temperature when the refrigerating machine oil/refrigerant ratio in a working fluid composition for a refrigerating machine is low (e.g. the ratio of refrigerating machine oil is 5 to 20 mass %) is easily lowered.

The % $C_A$ of the hydrocarbon-based base oil is preferably 0 or more, more preferably 1 or more, further preferably 5 or more, and also preferably 45 or less, more preferably 30 or less and further preferably 10 or less from the viewpoint of the compatibility and stability of the refrigerating machine oil.

The % $C_P$, % $C_N$ and % $C_A$ each in the present invention mean values measured by a method (n-d-M ring analysis) in accordance with ASTM D3238-95 (2010).

The sulfur content in the hydrocarbon-based base oil is preferably 8000 ppm by mass or less, and more preferably 1000 ppm by mass or less, can be also 200 ppm by mass or less or 20 ppm by mass or less, and can be also less than 10 ppm by mass, but can be also 10 ppm by mass or more, 100 ppm by mass or more or 200 ppm by mass or more from the viewpoint of the stability of the refrigerating machine oil. The sulfur content in the present invention means a value measured by the Ultraviolet fluorescence method prescribed in "Crude petroleum and petroleum products-Determination of sulfur content" in TIS K2541-6:2003.

The nitrogen content in the hydrocarbon-based base oil is preferably 200 ppm by mass or less, and more preferably 100 ppm by mass or less, can be also 50 ppm by mass or less, and can be also less than 10 ppm by mass, but can be also 10 ppm by mass or more or 50 ppm by mass or more from the viewpoint of the stability of the refrigerating machine oil. The nitrogen content in the present invention means a value measured in accordance with "Crude petroleum and petroleum products-Determination of nitrogen content" in JIS K2609:1998.

The amount of hydrocarbon-based base oil contained is preferably 80 mass % or more, more preferably 90 mass % or more and further preferably 95 mass % or more based on the total amount of refrigerating machine oil in order to provide even better characteristics required for a refrigerating machine oil such as lubricity, compatibility, thermochemical stability and electrical insulation properties.

The refrigerating machine oil may further contain various additives as needed. Such additives include an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier, a rust inhibitor and the like. The amount of additive contained is preferably 5 mass % or less and more preferably 2 mass % or less based on the total amount of refrigerating machine oil.

The refrigerating machine oil further contains preferably an acid scavenger among the above additives from the viewpoint that thermochemical stability is further improved. As the acid scavenger, an epoxy compound and a carbodiimide compound are provided as examples.

The epoxy compounds are not particularly restricted, and include a glycidyl ether epoxy compound, a glycidyl ester epoxy compound, an oxirane compound, an alkyloxirane compound, an alicyclic epoxy compound, an epoxidized fatty acid monoester, an epoxidized vegetable oil and the like. These epoxy compounds can be used individually or two or more epoxy compounds can be used in combination.

The glycidyl ether epoxy compounds can include n-butylphenylglycidyl ether, i-butylphenyl glycidyl ether, sec-butylphenyl glycidyl ether, tert-butylphenyl glycidyl ether, pentylphenylglycidyl ether, hexylphenylglycidyl ether, heptylphenylglycidyl ether, octylphenylglycidyl ether, nonylphenylglycidyl ether, decylphenylglycidyl ether, decyl glycidyl ether, undecyl glycidyl ether, dodecyl glycidyl ether, tridecyl glycidyl ether, tetradecyl glycidyl ether, 2-ethylhexylglycidyl ether, neopentylglycol diglycidyl ether, trimethylolpropane triglycidyl ether, pentaerythritol tetraglycidyl ether, 1,6-hexanediol diglycidyl ether, sorbitol polyglycidyl ether, a polyalkylene glycol monoglycidyl ether, and a polyalkylene glycol diglycidyl ether.

The glycidyl ester epoxy compounds can include glycidyl benzoate, glycidyl neodecanoate, glycidyl-2,2-dimethyl octanoate, glycidyl acrylate and glycidyl methacrylate.

The alicyclic epoxy compound is a compound having a partial structure represented by the following formula (1) in which the carbon atoms forming the epoxy group directly form the alicyclic ring.

[Chem. 1]

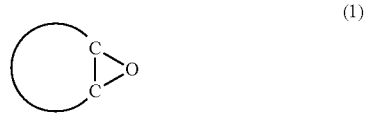

(1)

The alicyclic epoxy compounds can include 1,2-epoxycyclohexane, 1,2-epoxycyclopentane, 3',4'-epoxycyclohexylmethyl-3,4-epoxycyclohexane carboxylate, bis(3,4-epoxycyclohexylmethyl)adipate, exo-2,3-epoxynorbornane, bis(3,4-epoxy-6-methylcyclohexylmethyl)adipate, 2-(7-oxabicyclo[4.1.0]hept-3-yl)-spiro(1,3-dioxane-5,3'-[7]oxabicyclo[4.1.0]heptane, 4-(1'-methylepoxyethyl)-1,2-epoxy-2-methylcyclohexane and 4-epoxyethyl-1,2-epoxycyclohexane.

The allyloxirane compounds can include styrene oxide and an alkyl styrene oxide.

The alkyloxirane compounds can include 1,2-epoxybutane, 1,2-epoxypentane, 1,2-epoxybexane, 1,2-epoxyheptane, 1,2-epoxyoctane, 1,2-epoxynonane, 1,2-epoxydecane, 1,2-epoxyundecane, 1,2-epoxydodecane, 1,2-epoxytridecane, 1,2-epoxytetradecane, 1,2-epoxypentadecane, 1,2-epoxyhexadecane, 1,2-epoxyheptadecane, 1,2-epoxyoctadecane, 1,2-epoxynonadecane and 1,2-epoxyicosane.

The epoxidized fatty acid monoesters can include an ester of a C12-20 epoxidized fatty acid, and a C1-8 alcohol, or phenol or an alkylphenol. As the epoxidized fatty acid monoester, butyl, hexyl, benzyl, cyclohexyl, methoxyethyl, octyl, phenyl and butylphenyl esters of epoxystearic acid are preferably used.

The epoxidized vegetable oils can include epoxy compounds of vegetable oils such as soybean oil, linseed oil and cottonseed oil.

The carbodiimide compounds are not particularly restricted, and for example a dialkyl carbodiimide, diphenyl carbodiimide, and a bis(alkylphenyl)carbodiimide can be used. The dialkyl carbodiimides can include diisopropyl carbodiimide, dicyclohexyl carbodiimide and the like. The bis(alkylphenyl)carbodiimides can include ditolylcarbodiimide, bis(isopropylphenyl)carbodiimide, bis(diisopropylphenyl)carbodiimide, bis(triisopropylphenyl)carbodiimide, bis(butylphenyl)carbodiimide, bis(dibutylphenyl)carbodiimide, bis(nonylphenyl)carbodiimide and the like.

The refrigerating machine oil further contains preferably an antiwear agent among the above additives. Examples of favorable antiwear agents include a phosphoric acid ester, a thiophosphoric acid ester, a sulfide compound and a zinc dialkyl dithiophosphate. Among phosphoric acid esters, triphenyl phosphate (TPP) and tricresyl phosphate (TCP) are preferably used. Among thiophosphoric acid esters, triphenyl phosphorothionate (TPPT) is preferably used. The sulfide compounds have various types; however, a monosulfide compound is preferably used from the viewpoint that the stability of the refrigerating machine oil is secured and a change in quality of copper which is used in a large amount in the inside of refrigerating equipment can be suppressed.

The refrigerating machine oil further contains preferably an antioxidant among the above additives. As the antioxidant, there are a phenol compound such as di-tert-butyl-p-cresol, an amine compound such as an alkyldiphenylamine, and the like. In particular, the refrigerating machine oil contains a phenol compound as an antioxidant in preferably 0.02 mass % or more and 0.5 mass % or less based on the total amount of refrigerating machine oil.

The refrigerating machine oil further contains preferably a friction modifier, an extreme-pressure agent, a rust inhibitor, a metal deactivator or an antifoaming agent among the above additives. As the friction modifier, there are an aliphatic amine, an aliphatic amide, an aliphatic imide, an alcohol, an ester, a phosphoric acid ester amine salt, a phosphorous acid ester amine salt and the like. As the extreme-pressure agent, there are a sulfurized olefin, a sulfurized fat and oil, and the like. As the rust inhibitor, there is an ester or partial ester of an alkenyl succinic acid, and the like. As the metal deactivator, there are benzotriazole, a benzotriazole derivative, and the like. As the antifoaming agent, there are a silicone compound, a polyester compound, and the like.

The amount of base oil contained in the refrigerating machine oil is preferably 80 mass % or more, more preferably 90 mass % or more, and further preferably 95 mass % or more based on the total amount of refrigerating machine oil in order to provide good characteristics required for a refrigerating machine oil such as lubricity, compatibility, thermochemical stability and electrical insulation properties.

The viscosity index of the refrigerating machine oil is 120 or less, preferably 115 or less, more preferably 110 or less, further preferably 105 or less and particularly preferably 100 or less from the viewpoint of compatibility with a 1-chloro-2,3,3,3-tetrafluoropropene refrigerant. The viscosity index of the refrigerating machine oil is preferably −50 or more, more preferably −40 or more and further preferably −30 or more from the viewpoint of lubricity. The viscosity index of the refrigerating machine oil is preferably −50 to 120, −50 to 115, −50 to 110, −50 to 105, −50 to 100, −40 to 120, −40 to 115, −40 to 110, −40 to 105, −40 to 100, −30 to 120, −30 to 115, −30 to 110, −30 to 105, or −30 to 100 from the viewpoint of providing both compatibility and lubricity.

The kinematic viscosity at 40° C. of the refrigerating machine oil can be preferably 3 $mm^2/s$ or more, more preferably 4 $mm^2/s$ or more, further preferably 5 $mm^2/s$ or more, and also preferably 1000 $mm^2/s$ or less, more preferably 500 $mm^2/s$ or less, and further preferably 400 $mm^2/s$ or less. The kinematic viscosity at 100° C. of the refrigerating machine oil can be preferably 1 $mm^2/s$ or more, more preferably 2 $mm^2/s$ or more, and also preferably 100 $mm^2/s$ or less, and more preferably 50 $mm^2/s$ or less.

The volume resistivity of the refrigerating machine oil is not particularly limited, and can be preferably $1.0 \times 10^9$ Ω·m or more, more preferably $1.0 \times 10^{10}$ Ω·m or more, and further preferably $1.0 \times 10^{11}$ Ω·m or more. In particular, when the refrigerating machine oil is used for a hermetic refrigerating machine, there is a tendency that high electrical insulation properties are required. The volume resistivity in the present invention means a value at 25° C. measured in accordance with "Testing methods of electrical insulating oils" in JIS C2101:1999.

The amount of moisture contained in the refrigerating machine oil is not particularly limited, and can be preferably 1000 ppm or less, more preferably 300 ppm or less, and further preferably 100 ppm or less based on the total amount of refrigerating machine oil. In particular, when the refrigerating machine oil is used for a hermetic refrigerating machine, it is required that the amount of moisture contained be small from the viewpoint of an influence on the thermochemical stability and electrical insulation properties of the refrigerating machine oil.

The acid value of the refrigerating machine oil is not particularly limited, and can be preferably 1.0 mg KOH/g or less, more preferably 0.5 mg KOH/g or less and further preferably 0.1 mg KOH/g or less so as to prevent corrosion on metal used for a refrigerating machine or piping and, when an ester is contained in the refrigerating machine oil, prevent the decomposition of the ester. The acid value in the present invention means an acid value measured in accordance with "Petroleum products and lubricants-Determination of neutralization number" in JIS K2501:2003.

The ash content in the refrigerating machine oil is not particularly limited, and can be preferably 100 ppm or less and more preferably 50 ppm or less so as to increase the thermochemical stability of the refrigerating machine oil and suppress the formation of e.g. sludge. The ash content in the present invention means an ash value measured in accordance with "Crude oil and petroleum products-Determination of ash and sulfated ash" in JIS K2272:1998.

The pour point of the refrigerating machine oil can be preferably 10° C. or less, more preferably 0° C. or less, and further preferably −10° C. or less. The pour point in the present invention means a pour point measured in accordance with JIS K2269.

A composition containing the above hydrocarbon-based base oil, and a composition with a viscosity index of 120 or less containing the above hydrocarbon-based base oil and the above various additives are favorably used as a constituent of a refrigerating machine oil which is used with a 1-chloro-2,3,3,3-tetrafluoropropene refrigerant, or a constituent of a working fluid composition for a refrigerating machine containing the refrigerating machine oil and a 1-chloro-2,3,3,3-tetrafluoropropene refrigerant.

A composition containing the above hydrocarbon-based base oil, and a composition with a viscosity index of 120 or less containing the above hydrocarbon-based base oil and the above various additives are favorably used for producing a refrigerating machine oil which is used with a 1-chloro-2,3,3,3-tetrafluoropropene refrigerant, or a working fluid composition for a refrigerating machine containing the refrigerating machine oil and a 1-chloro-2,3,3,3-tetrafluoropropene refrigerant.

The refrigerating machine oil according to the present embodiment is used with a 1-chloro-2,3,3,3-tetrafluoropropene (HCFO-1224yd) refrigerant, and favorably used particularly with a cis-1-chloro-2,3,3,3-tetrafluoropropene (HCFO-1224yd(Z)) refrigerant. The working fluid composition for a refrigerating machine according to the present embodiment contains a 1-chloro-2,3,3,3-tetrafluoropropene (HCFO-1224yd) refrigerant, and contains preferably a cis-1-chloro-2,3,3,3-tetrafluoropropene (HCFO-1224yd(Z)) refrigerant. The 1-chloro-2,3,3,3-tetrafluoropropene (HCFO-1224yd) refrigerant can be any of cis-1-chloro-2,3,3,3-tetrafluoropropene (HCFO-1224yd(Z)), trans-1-chloro-2,3,3,3-tetrafluoropropene (HCFO-1224yd(E)) and a mixture thereof. The 1-chloro-2,3,3,3-tetrafluoropropene (HCFO-1224yd) refrigerant preferably contains cis-1-chloro-2,3,3,3-tetrafluoropropene (HCFO-1224yd(Z)) as the main component. The ratio of cis-1-chloro-2,3,3,3-tetrafluoropropene (HCFO-1224yd(Z)) to the 1-chloro-2,3,3,3-tetrafluoropropene (HCFO-1224yd) refrigerant is preferably 50 mol % or more, more preferably 70 mol % or more, further preferably 90 mol % or more, and particularly preferably 95 mol % or more, and can be 100 mol % (only cis-1-chloro-2,3,3,3-tetrafluoropropene (HCFO-1224yd(Z))).

The refrigerant which is used with the refrigerating machine oil, and the refrigerant contained in the working fluid composition for the refrigerating machine may further contain known refrigerants such as a saturated fluorohydrocarbon refrigerant and an unsaturated fluorohydrocarbon refrigerant in addition to 1-chloro-2,3,3,3-tetrafluoropropene (HCFO-1224yf). The amount of 1-chloro-2,3,3,3-tetrafluoropropene (HCFO-1224yf) contained is preferably 90 mass % or less, more preferably 60 mass % or less, further preferably 50 mass % or less, particularly preferably 40 mass % or less, and most preferably 20 mass % or less based on the total amount of refrigerant from the viewpoint of the stability of the refrigerating machine oil under a refrigerant atmosphere. The amount of 1-chloro-2,3,3,3-tetrafluoropropene (HCFO-1224yf) contained is preferably 20 mass % or more, more preferably 40 mass % or more, further preferably 50 mass % or more, particularly preferably 60 mass % or more, and most preferably 90 mass % or more based on the total amount of refrigerant from the viewpoint of a reduction in GWP.

As the saturated fluorohydrocarbon refrigerant, one or a mixture of two or more selected from difluoromethane (HFC-32), pentafluoroethane (HFC-125), 1,1,2,2-tetrafluoroethane (HFC-134), 1,1,1,2-tetrafluoroethane (HFC-134a), 1,1-difluoroethane (HFC-152a), fluoroethane (HFC-161), 1,1,1,2,3,3,3-heptafluoropropane (HFC-227ea), 1,1,1,2,3,3-hexafluoropropane (HFC-236ea), 1,1,1,3,3,3-hexafluoropropane (HFC-236fa), 1,1,1,3,3-pentafluoropropane (HFC-245fa), and 1,1,1,3,3-pentafluorobutane (HEC-365mfc) is provided as an example. Among these, difluoromethane (HFC-32) and 1,1,1,2-tetrafluoroethane (HFC-134a) are preferably used from the viewpoint of the stability of the refrigerating machine oil under a refrigerant atmosphere and a reduction in GWP.

As the unsaturated fluorohydrocarbon refrigerant, one or a mixture of two or more selected from 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye) and 3,3,3-trifluoropropene (HFO-1243zf), cis-1-chloro-3,3,3-trifluoropropene (1233zd(Z)) and trans-1-chloro-3,3,3-trifluoropropene (1233zd(E)) is provided as an example. Among these, 2,3,3,3-tetrafluoropropene (HFO-1234yf) is preferably used from the viewpoint of the stability of the refrigerating machine oil under a refrigerant atmosphere and a reduction in GWP.

The amount of refrigerating machine oil contained in the working fluid composition for the refrigerating machine is not particularly restricted, and can be preferably 1 part by mass or more, more preferably 2 parts by mass or more, and also preferably 500 parts by mass or less, and more preferably 400 parts by mass or less with respect to 100 parts by mass of refrigerant.

The working fluid composition for the refrigerating machine and refrigerating machine oil are preferably used for a room air-conditioner having a reciprocating or rotary hermetic compressor, a cold store, or an open type or closed type car air-conditioner. The working fluid composition for the refrigerating machine and refrigerating machine oil are preferably used for e.g. a cooling system in a dehumidifier, a water heater, a freezer, a cold storage/refrigerated warehouse, a vending machine, a showcase, a chemical plant, etc. The working fluid composition for the refrigerating machine and refrigerating machine oil are also preferably used for a device provided with a centrifugal compressor.

EXAMPLES

The present invention will now be described in more detail by way of examples thereof. It should be noted however that the present invention is not limited to the following examples.

As base oils 1 to 10, hydrocarbon oils given below were prepared. The properties of base oils 1 to 10 are shown in Tables 1 and 2.

Base oil 1: a base oil obtained by purifying a vacuum distillate of naphthenic crude oil by furfural extraction and hydrotreating, Base oil 2: a base oil obtained by purifying a vacuum distillate of paraffinic crude oil by furfural extraction, Base oil 3: a base oil obtained by purifying a vacuum distillate of naphthenic crude oil by furfural extraction and hydrotreating, Base oil 4: a base oil obtained by purifying a vacuum distillate of naphthenic crude oil by furfural extraction and hydrotreating, Base oil 5: branched alkylbenzene A, Base oil 6: branched alkylbenzene B, Base oil 7: linear alkylbenzene, Base oil 8: a base oil obtained by hydrocracking • isomerization of petroleum wax,
Base oil 9: polyα-olefin, and
Base oil 10: a base oil obtained by purifying a vacuum distillate of paraffinic crude oil by furfural extraction and hydrotreating.

TABLE 1

|  | Base oil 1 | Base oil 2 | Base oil 3 | Base oil 4 | Base oil 5 |
|---|---|---|---|---|---|
| Kinematic viscosity 40° C. (mm$^2$/s) | 58.4 | 94.8 | 52.7 | 96.6 | 23.9 |
| Kinematic viscosity 100° C. (mm$^2$/s) | 6.1 | 10.8 | 5.8 | 8.6 | 3.8 |
| Viscosity index | 6 | 98 | 6 | 36 | −23 |
| % $C_P$ | 45 | 68 | 37 | 49 | 63 |
| % $C_N$ | 45 | 26 | 51 | 40 | 19 |
| % $C_A$ | 10 | 6 | 12 | 11 | 18 |
| % $C_N$/% $C_P$ | 1.0 | 0.4 | 1.4 | 0.8 | 0.3 |
| Sulfur content (ppm by mass) | 10 | 8000 | 160 | 430 | 0 |
| Nitrogen content (ppm by mass) | 22 | 100 | 40 | 94 | 0 |

TABLE 2

|  | Base oil 6 | Base oil 7 | Base oil 8 | Base oil 9 | Base oil 10 |
|---|---|---|---|---|---|
| Kinematic viscosity 40° C. (mm$^2$/s) | 60.8 | 24.5 | 16.1 | 106.0 | 46.7 |
| Kinematic viscosity 100° C. (mm$^2$/s) | 5.9 | 4.3 | 3.9 | 14.7 | 7.6 |
| Viscosity index | −24 | 58 | 142 | 143 | 129 |
| % $C_P$ | 75 | 64 | 92 | 91 | 80 |
| % $C_N$ | 13 | 22 | 8 | 8 | 20 |
| % $C_A$ | 12 | 14 | 0 | 1 | 0 |
| % $C_N$/% $C_P$ | 0.2 | 0.3 | 0.1 | 0.1 | 0.3 |
| Sulfur content (ppm by mass) | 0 | 0 | 10 | 10 | 0 |
| Nitrogen content (ppm by mass) | 0 | 0 | 10 | 10 | 0 |

Refrigerating machine oils having composition shown in Tables 3 and 4 were prepared using the base oils 1 to 10 and additives described below:
Additive 1: glycidyl neodecanoate,
Additive 2: triphenyl phosphorothioate,
Additive 3: tricresyl phosphate, and
Additive 4: 2,6-di-tert-butyl-p-cresol.

The testing for compatibility with refrigerant described below was carried out for each refrigerating machine oil. The results are shown in Tables 3 and 4.

(Refrigerant Compatibility Test)

In accordance with "Test method for compatibility with refrigerant" in "Refrigerating machine oils" in JIS K2211: 2009, 10 g of refrigerating machine oil was blended with 10 g of cis-1-chloro-2,3,3,3-tetrafluoropropene (HCFO-1224yf (Z)) refrigerant, and the blend was observed whether the refrigerant and refrigerating machine oil were compatible with each other at 0° C. In the tables, a case where a refrigerant and a refrigerating machine oil are compatible with each other at 0° C. was shown as "compatible" and a case where the two are separated was shown as "separated."

TABLE 3

|  |  | Examples | | | | | | |
|---|---|---|---|---|---|---|---|---|
|  |  | 1 | 2 | 3 | 4 | 5 | 6 | 7 |
| Composition (mass %, based on total amount of refrigerating machine oil) | Base oil 1 | 100 | — | — | — | — | — | — |
|  | Base oil 2 | — | 100 | — | — | — | — | — |
|  | Base oil 3 | — | — | 100 | — | — | — | — |
|  | Base oil 4 | — | — | — | 100 | — | — | — |
|  | Base oil 5 | — | — | — | — | 100 | — | — |
|  | Base oil 6 | — | — | — | — | — | 100 | — |
|  | Base oil 7 | — | — | — | — | — | — | 100 |
|  | Base oil 8 | — | — | — | — | — | — | — |
|  | Base oil 9 | — | — | — | — | — | — | — |
|  | Base oil 10 | — | — | — | — | — | — | — |
|  | Additive 1 | — | — | — | — | — | — | — |
|  | Additive 2 | — | — | — | — | — | — | — |
|  | Additive 3 | — | — | — | — | — | — | — |
|  | Additive 4 | — | — | — | — | — | — | — |
| Compatibility |  | compatible | compatible | compatible | compatible | compatible | compatible | compatible |

TABLE 4

|  |  | Examples | | | Comparative Examples | | |
|---|---|---|---|---|---|---|---|
|  |  | 8 | 9 | 10 | 1 | 2 | 3 |
| Composition (mass %, based on total amount of refrigerating machine oil) | Base oil 1 | 98.6 | — | — | — | — | — |
|  | Base oil 2 | — | 98.5 | — | — | — | — |
|  | Base oil 3 | — | — | — | — | — | — |
|  | Base oil 4 | — | — | — | — | — | — |
|  | Base oil 5 | — | — | — | — | — | — |
|  | Base oil 6 | — | — | — | — | — | — |
|  | Base oil 7 | — | — | 99.4 | — | — | — |
|  | Base oil 8 | — | — | — | 100 | — | — |
|  | Base oil 9 | — | — | — | — | 100 | — |

TABLE 4-continued

|  | Examples | | | Comparative Examples | | |
|---|---|---|---|---|---|---|
|  | 8 | 9 | 10 | 1 | 2 | 3 |
| Base oil 10 | — | — | — | — | — | 100 |
| Additive 1 | 0.5 | 1.0 | 0.3 | — | — | — |
| Additive 2 | 0.3 | — | — | — | — | — |
| Additive 3 | 0.3 | 0.5 | 0.1 | — | — | — |
| Additive 4 | 0.3 | — | 0.2 | — | — | — |
| Compatibility | compatible | compatible | compatible | separated | separated | separated |

(Measurement of Two-Layer Separation Temperature)

In accordance with "Testing method for compatibility with refrigerant" in "Refrigerating machine oils" in JIS K2211:2009, a mixture obtained by mixing each refrigerating machine oil in Example 2 and 4 and a cis-1-chloro-2,3,3,3-tetrafluoropropene (HCFO)-1224yf(Z)) refrigerant at a mass ratio of 10:90 (refrigerating machine oil:refrigerant) was gradually cooled from 20° C. to −40° C., and a temperature at which phase separation or cloudiness occurred was used as a two-layer separation temperature. As a result, the two-layer separation temperature was 12° C. in Example 2 and −18° C. in Example 4.

The invention claimed is:

1. A refrigerating machine oil comprising a hydrocarbon-based base oil,
    the refrigerating machine oil having a viscosity index of −30 to 105, and being used with a 1-chloro-2,3,3,3-tetrafluoropropene refrigerant, wherein
    the hydrocarbon-based base oil is at least one paraffinic mineral oil-based hydrocarbon oil,
    the hydrocarbon-based base oil has a viscosity index of −30 to 105, a % $C_P$ of 63 to 90, and a % $C_N$ of 13 to 40, and
    an amount of the hydrocarbon-based base oil is 95 mass % or more based on the total amount of refrigerating machine oil.

2. The refrigerating machine oil according to claim 1, wherein the hydrocarbon-based base oil has
    a kinematic viscosity at 40° C. of 20 to 120 mm$^2$/s,
    a kinematic viscosity at 100° C. of 2 to 12 mm$^2$/s,
    a % $C_A$ of 5 to 30,
    a % $C_N$/% $C_P$ of 0.2 to 1.5,
    a sulfur content of 8000 ppm by mass or less, and
    a nitrogen content of 100 ppm by mass or less.

3. The refrigerating machine oil according to claim 1, further comprising at least one additive selected from the group consisting of an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier and a rust inhibitor.

4. A working fluid composition for a refrigerating machine comprising:
    a refrigerating machine oil comprising a hydrocarbon-based base oil, the refrigerating machine oil having a viscosity index of −30 to 105, and
    a 1-chloro-2,3,3,3-tetrafluoropropene refrigerant,
    wherein
    the hydrocarbon-based base oil is at least one paraffinic mineral oil-based hydrocarbon oil,
    the hydrocarbon-based base oil has a viscosity index of −30 to 105, a % $C_P$ of 63 to 90, and a % $C_N$ of 13 to 40, and
    an amount of the hydrocarbon-based base oil is 95 mass % or more based on the total amount of refrigerating machine oil.

5. The working fluid composition for a refrigerating machine according to claim 4, wherein the hydrocarbon-based base oil has
    a kinematic viscosity at 40° C. of 20 to 120 mm$^2$/s,
    a kinematic viscosity at 100° C. of 2 to 12 mm$^2$/s,
    a % $C_A$ of 5 to 30,
    a % $C_N$/% $C_P$ of 0.2 to 1.5,
    a sulfur content of 8000 ppm by mass or less, and
    a nitrogen content of 100 ppm by mass or less.

6. The working fluid composition for a refrigerating machine according to claim 4, wherein the refrigerating machine oil further comprises at least one additive selected from the group consisting of an acid scavenger, an antioxidant, an extreme-pressure agent, an oiliness agent, an antifoaming agent, a metal deactivator, an antiwear agent, a viscosity index improver, a pour-point depressant, a detergent dispersant, a friction modifier and a rust inhibitor.

* * * * *